US012735538B2

(12) United States Patent
Harris et al.

(10) Patent No.: US 12,735,538 B2
(45) Date of Patent: Sep. 15, 2026

(54) LOW FORMALDEHYDE RIDGE VENT MATERIAL

(71) Applicant: MARCO INDUSTRIES INC., Tulsa, OK (US)

(72) Inventors: Robert P. Harris, Tulsa, OK (US); Marlene Gomez, Tulsa, OK (US)

(73) Assignee: MARCO INDUSTRIES INC., Tulsa, OK (US)

( * ) Notice: Subject to any disclaimer, the term of this patent is extended or adjusted under 35 U.S.C. 154(b) by 191 days.

(21) Appl. No.: 18/521,796

(22) Filed: Nov. 28, 2023

(65) Prior Publication Data

US 2024/0239972 A1 Jul. 18, 2024

Related U.S. Application Data

(60) Provisional application No. 63/589,445, filed on Oct. 11, 2023, provisional application No. 63/439,712, filed on Jan. 18, 2023.

(51) Int. Cl.

*C08J 5/04* (2006.01)
*C08J 5/10* (2006.01)

(52) U.S. Cl.

CPC ................ *C08J 5/046* (2013.01); *C08J 5/10* (2013.01); *C08J 2333/08* (2013.01)

(58) Field of Classification Search

None

See application file for complete search history.

(56) References Cited

U.S. PATENT DOCUMENTS

| | | | |
|---|---|---|---|
| 429,937 | A | 6/1890 | Mitchell |
| 2,318,820 | A | 5/1943 | Voigt et al. |
| 2,470,201 | A | 5/1949 | Werner |
| 2,490,220 | A | 12/1949 | Leslie |
| 3,492,192 | A | 1/1970 | Bullard |
| 3,884,009 | A | 5/1975 | Frohlich et al. |
| 3,949,657 | A | 4/1976 | Sells |
| 4,024,685 | A | 5/1977 | Aarons |
| 4,189,886 | A | 2/1980 | Fohlich et al. |
| 4,189,989 | A | 2/1980 | Maze |
| 4,280,399 | A | 7/1981 | Cunning |
| 4,325,290 | A | 4/1982 | Wolfert |

(Continued)

FOREIGN PATENT DOCUMENTS

| | | | |
|---|---|---|---|
| CN | 212984379 | U | 4/2021 |
| DE | 19643591 | A1 | 4/1998 |

(Continued)

OTHER PUBLICATIONS

Korean Intellectual Property Office, "PCT International Search Report and Written Opinion," mailed Jul. 23, 2014 for International Application No. PCT/US2014/027897, 12 pages.

(Continued)

*Primary Examiner* — Shawn Mckinnon

(74) *Attorney, Agent, or Firm* — Dorsey & Whitney LLP

(57) ABSTRACT

The present disclosure generally relates to formulations for, and methods of making and using, a roof ridge vent material having no or a low amount of formaldehyde. Compositions for making the material include at least one polyester fiber and a binder mix. The binder mix includes at least one acrylic emulsion, at least one fire retardant, at least one surfactant, at least one defoaming agent, and water.

23 Claims, 8 Drawing Sheets

(56) References Cited

U.S. PATENT DOCUMENTS

| | | | | |
|---|---|---|---|---|
| 4,545,291 | A | 10/1985 | Kutsch et al. | |
| 4,545,292 | A | 10/1985 | Inokawa et al. | |
| 4,558,637 | A | 12/1985 | Mason | |
| 4,570,396 | A | 2/1986 | Struben | |
| 4,598,505 | A | 7/1986 | Mcgown | |
| 4,643,080 | A | 2/1987 | Trostle et al. | |
| 4,689,264 | A * | 8/1987 | Fink | D04H 1/4258 442/164 |
| 4,754,589 | A | 7/1988 | Leth | |
| 4,788,801 | A | 12/1988 | Jones | |
| 4,843,953 | A | 7/1989 | Sells | |
| 4,876,950 | A | 10/1989 | Rudeen | |
| 4,924,761 | A | 5/1990 | Macleod et al. | |
| 4,957,037 | A | 9/1990 | Tubbesing et al. | |
| 4,995,308 | A | 2/1991 | Waggoner | |
| 5,002,816 | A | 3/1991 | Hofmann et al. | |
| 5,009,149 | A | 4/1991 | Macleod et al. | |
| 5,018,748 | A | 5/1991 | Schalle | |
| 5,022,203 | A | 6/1991 | Boyd | |
| 5,030,507 | A * | 7/1991 | Mudge | D04H 1/587 442/147 |
| 5,050,489 | A | 9/1991 | Mankowski | |
| 5,060,431 | A | 10/1991 | Macleod et al. | |
| 5,092,225 | A | 3/1992 | Sells | |
| 5,095,810 | A | 3/1992 | Robinson | |
| 5,122,095 | A | 6/1992 | Wolfert | |
| 5,167,579 | A | 12/1992 | Rotter | |
| 5,174,076 | A | 12/1992 | Schiedegger et al. | |
| 5,235,016 | A * | 8/1993 | Vafa | C08F 218/08 525/59 |
| 5,288,269 | A | 2/1994 | Hansen | |
| 5,304,095 | A | 4/1994 | Morris | |
| 5,326,318 | A | 7/1994 | Rotter | |
| 5,328,407 | A | 7/1994 | Sells | |
| 5,331,783 | A | 7/1994 | Kasner et al. | |
| 5,332,393 | A | 7/1994 | Godl | |
| 5,352,154 | A | 10/1994 | Rotter et al. | |
| 5,353,154 | A | 10/1994 | Lutz et al. | |
| 5,425,672 | A | 6/1995 | Rotter | |
| 5,427,571 | A | 6/1995 | Sells | |
| 5,439,417 | A | 8/1995 | Sells | |
| 5,458,538 | A | 10/1995 | Macleod et al. | |
| 5,473,847 | A | 12/1995 | Crookston | |
| 5,542,882 | A | 8/1996 | Sells | |
| 5,561,953 | A | 10/1996 | Rotter | |
| 5,593,348 | A | 1/1997 | Rickert | |
| 5,603,657 | A | 2/1997 | Sells | |
| 5,803,805 | A | 9/1998 | Sells | |
| 5,816,014 | A | 10/1998 | Tzeng et al. | |
| 5,826,383 | A | 10/1998 | Garrison | |
| 5,867,956 | A | 2/1999 | Gregory et al. | |
| 5,921,863 | A | 7/1999 | Sells | |
| 5,924,925 | A | 7/1999 | Nystrom | |
| 5,947,817 | A | 9/1999 | Morris et al. | |
| 6,077,159 | A | 6/2000 | Clayton | |
| 6,079,166 | A | 6/2000 | Mason et al. | |
| 6,125,602 | A | 10/2000 | Freiborg et al. | |
| 6,149,517 | A | 11/2000 | Hansen | |
| 6,155,008 | A | 12/2000 | Mckee | |
| 6,267,668 | B1 | 7/2001 | Morris | |
| 6,298,613 | B1 | 10/2001 | Coulton et al. | |
| 6,308,472 | B1 | 10/2001 | Coulton et al. | |
| 6,362,353 | B1 * | 3/2002 | Ellis | C07D 307/20 554/167 |
| 6,418,678 | B2 | 7/2002 | Rotter | |
| 6,450,882 | B1 | 9/2002 | Morris et al. | |
| 6,458,029 | B2 | 10/2002 | Morris | |
| 6,491,581 | B1 | 12/2002 | Mankowski | |
| 6,599,184 | B2 | 7/2003 | Morris | |
| 6,647,675 | B1 | 11/2003 | Castellanos | |
| 6,662,510 | B2 * | 12/2003 | Rotter | F24F 7/02 52/302.1 |
| 6,767,281 | B2 | 7/2004 | Mckee | |
| 6,773,342 | B2 | 8/2004 | Rotter | |
| 6,780,099 | B1 | 8/2004 | Harper | |
| 6,944,997 | B2 | 9/2005 | Verkamp | |
| 6,966,156 | B2 | 11/2005 | Dixon | |
| 6,997,800 | B1 | 2/2006 | Kohler | |
| 7,566,265 | B2 | 7/2009 | Reeves | |
| 7,594,363 | B2 | 9/2009 | Polumbus et al. | |
| 8,024,897 | B2 | 9/2011 | Polumbus et al. | |
| 8,037,643 | B1 | 10/2011 | Anderson | |
| 8,075,376 | B1 | 12/2011 | Inzeo | |
| 8,083,576 | B2 | 12/2011 | Rotter | |
| 8,276,331 | B2 | 10/2012 | Polumbus et al. | |
| 8,291,655 | B2 | 10/2012 | Mcglothlin | |
| 8,302,352 | B2 | 11/2012 | Bahn et al. | |
| 8,650,833 | B1 | 2/2014 | Polston | |
| 8,782,967 | B2 | 7/2014 | Daniels | |
| 8,790,167 | B2 | 7/2014 | Holland et al. | |
| 9,151,059 | B2 | 10/2015 | Pavlansky et al. | |
| 9,243,813 | B2 | 1/2016 | Mantyla et al. | |
| 9,334,655 | B2 * | 5/2016 | Polumbus | E04D 1/30 |
| 9,447,583 | B2 | 9/2016 | Tovmasyan | |
| 9,845,968 | B2 | 12/2017 | Couto | |
| 10,590,654 | B2 | 3/2020 | Polumbus et al. | |
| 10,676,935 | B1 | 6/2020 | Huang | |
| 10,746,421 | B2 | 8/2020 | Fiser | |
| 11,519,617 | B2 | 12/2022 | Oddy | |
| 11,739,532 | B1 | 8/2023 | Robida | |
| 2002/0032000 | A1 | 3/2002 | Lawless, III et al. | |
| 2002/0194799 | A1 | 12/2002 | Sharp et al. | |
| 2003/0022618 | A1 | 1/2003 | Miller | |
| 2003/0051419 | A1 | 3/2003 | Suzuki | |
| 2003/0077999 | A1 | 4/2003 | Mankowski | |
| 2004/0000101 | A1 | 1/2004 | Dixon | |
| 2004/0137185 | A1 | 7/2004 | Sieber et al. | |
| 2005/0048912 | A1 | 3/2005 | Rotter | |
| 2005/0106360 | A1 | 5/2005 | Johnston et al. | |
| 2005/0202779 | A1 | 9/2005 | Smith | |
| 2005/0233691 | A1 | 10/2005 | Horton | |
| 2005/0239392 | A1 | 10/2005 | Sells | |
| 2005/0241248 | A1 | 11/2005 | Ridenour | |
| 2006/0019598 | A1 | 1/2006 | Rotter | |
| 2006/0040608 | A1 | 2/2006 | Coulton | |
| 2006/0116069 | A1 | 6/2006 | Urbanski et al. | |
| 2006/0121845 | A1 | 6/2006 | Sells | |
| 2006/0223436 | A1 | 10/2006 | Matyja | |
| 2007/0072539 | A1 | 3/2007 | Sells | |
| 2007/0093197 | A1 | 4/2007 | Shah | |
| 2007/0173191 | A1 | 7/2007 | Daniels et al. | |
| 2009/0113823 | A1 | 5/2009 | Osborne | |
| 2009/0298370 | A1 | 12/2009 | Rock | |
| 2010/0184366 | A1 | 7/2010 | Hassenstab | |
| 2011/0209433 | A1 * | 9/2011 | Polumbus | E04D 3/40 52/745.21 |
| 2011/0312265 | A1 | 12/2011 | Leblanc | |
| 2013/0046055 | A1 * | 2/2013 | Michl | C08F 220/06 264/234 |
| 2013/0344796 | A1 | 12/2013 | Rossetta | |
| 2016/0138270 | A1 | 5/2016 | Rotter | |
| 2016/0146499 | A1 | 5/2016 | Sherry | |
| 2017/0059184 | A1 | 3/2017 | Haynes et al. | |
| 2017/0146253 | A1 | 5/2017 | Mantyla et al. | |
| 2018/0328040 | A1 | 11/2018 | Siri | |
| 2018/0328041 | A1 | 11/2018 | Bourque | |
| 2021/0238858 | A1 | 8/2021 | Polumbus et al. | |
| 2023/0228092 | A1 | 7/2023 | Robida | |
| 2023/0243528 | A1 | 8/2023 | Vallery et al. | |
| 2024/0003560 | A1 | 1/2024 | Allaster et al. | |
| 2024/0175588 | A1 | 5/2024 | Harris et al. | |
| 2024/0183549 | A1 | 6/2024 | Harris et al. | |
| 2024/0183550 | A1 | 6/2024 | Vallery et al. | |

FOREIGN PATENT DOCUMENTS

| | | | |
|---|---|---|---|
| FR | 2966228 | A1 | 4/2012 |
| JP | 07-109797 | | 4/1995 |
| JP | 07157960 | A | 6/1995 |
| JP | 2012087618 | A | 5/2012 |
| WO | 95/21975 | A1 | 8/1995 |

(56) References Cited

FOREIGN PATENT DOCUMENTS

| | | | |
|---|---|---|---|
| WO | 97/32940 | A1 | 9/1997 |
| WO | 02092930 | A1 | 11/2002 |
| WO | 2014143787 | A1 | 9/2014 |

OTHER PUBLICATIONS

Canadian Intellectual Property Office, "Third Office Action," mailed Jan. 27, 2015, for Canadian Patent Application No. 2,718,316, 10 pages.
Canadian Intellectual Property Office, "First Office Action," mailed Jun. 12, 2012, for Canadian Application No. 2,718,316, 4 pages.
Canadian Intellectual Property Office, "Second Office Action," mailed Mar. 21, 2013, for Canadian Application No. 2,718,316, 5 pages.
European Patent Office, "Communication pursuant to Rules 70(2) and 70a(2) EPC," mailed Jul. 11, 2013, for European Application No. 11748245.5, 8 pages.
European Patent Office, "Supplementary European Search Report," mailed Jun. 24, 2013, for European Application No. 11748245.5, 8 pages.
European Patent Office, "European Search Report," mailed Nov. 11, 2024, for European Application No. 24185162.5, 11 pages.
U.S. Patent and Trademark Office, Office, "PCT International Search Report and Written Opinion", mailed Nov. 19, 2025, for PCT Application No. PCT/US2025/047907, 9 pages.
Total Screen, "California Building Code Chapter 7A—Explained," Online at https://totalscreen.com/fire-protection-vent-covers/california-building-code-chapter-7a-explained/, Jan. 1, 2008, 17 pages.

* cited by examiner

LOW FORMALDEHYDE RIDGE VENT MATERIAL

CROSS-REFERENCE TO RELATED APPLICATION(S)

This application claims the benefit of U.S. Provisional Application No. 63/439,712, filed Jan. 18, 2023, the disclosure of which is hereby incorporated by reference.

This application also claims the benefit of U.S. Provisional Application No. 63/589,445, filed Oct. 11, 2023, the disclosure of which is hereby incorporated by reference.

TECHNICAL FIELD

The present disclosure generally relates to formulations for, and methods of making and using, a roof ridge vent material having no or a low amount of formaldehyde.

BACKGROUND

Formaldehyde is a colorless, flammable gas. It is released into the air from a variety of sources, including insulation materials. Exposure to formaldehyde can cause leukemia and cancers of the nose, throat, and sinuses. Some governments and agencies have sought to reduce consumers' exposure to formaldehyde or at least warn consumers of the risks of exposure to formaldehyde. For example, the state of California enacted the Safe Drinking Water and Toxic Enforcement Act of 1986 (Proposition 65), which requires businesses to provide warnings to residents about significant exposures to chemicals—including formaldehyde—that cause cancer, birth defects, or other reproductive harm. Product warnings are not required when the anticipated exposure level will not pose a significant risk of cancer. Products with no or a low amount of formaldehyde are safer, healthier, and favored in the marketplace.

The information included in this Background section of the specification is included for technical reference purposes only and is not to be regarded as subject matter by which the scope of the description is to be bound or as an admission of prior art.

SUMMARY

Compositions, generally for making roof ridge vent materials, are disclosed. The compositions include at least one polyester fiber and a binder mix. The binder mix includes at least one acrylic emulsion, at least one fire retardant, at least one surfactant, at least one defoaming agent, and water.

Methods of using the roof ridge vent materials, such as to seal a ridge vent, are also disclosed. The methods include applying a strip to a major roof panel and attaching a minor roof panel to the major roof panel such that the strip is positioned between the roof panels. The strip includes at least one material made of at least one polyester fiber and a binder mix. The binder mix includes at least one acrylic emulsion, at least one fire retardant, at least one surfactant, at least one defoaming agent, and water. Practicing the method results in an estimated total daily intake of up to about 25 μg/day formaldehyde.

DETAILED DESCRIPTION

Figure 1:
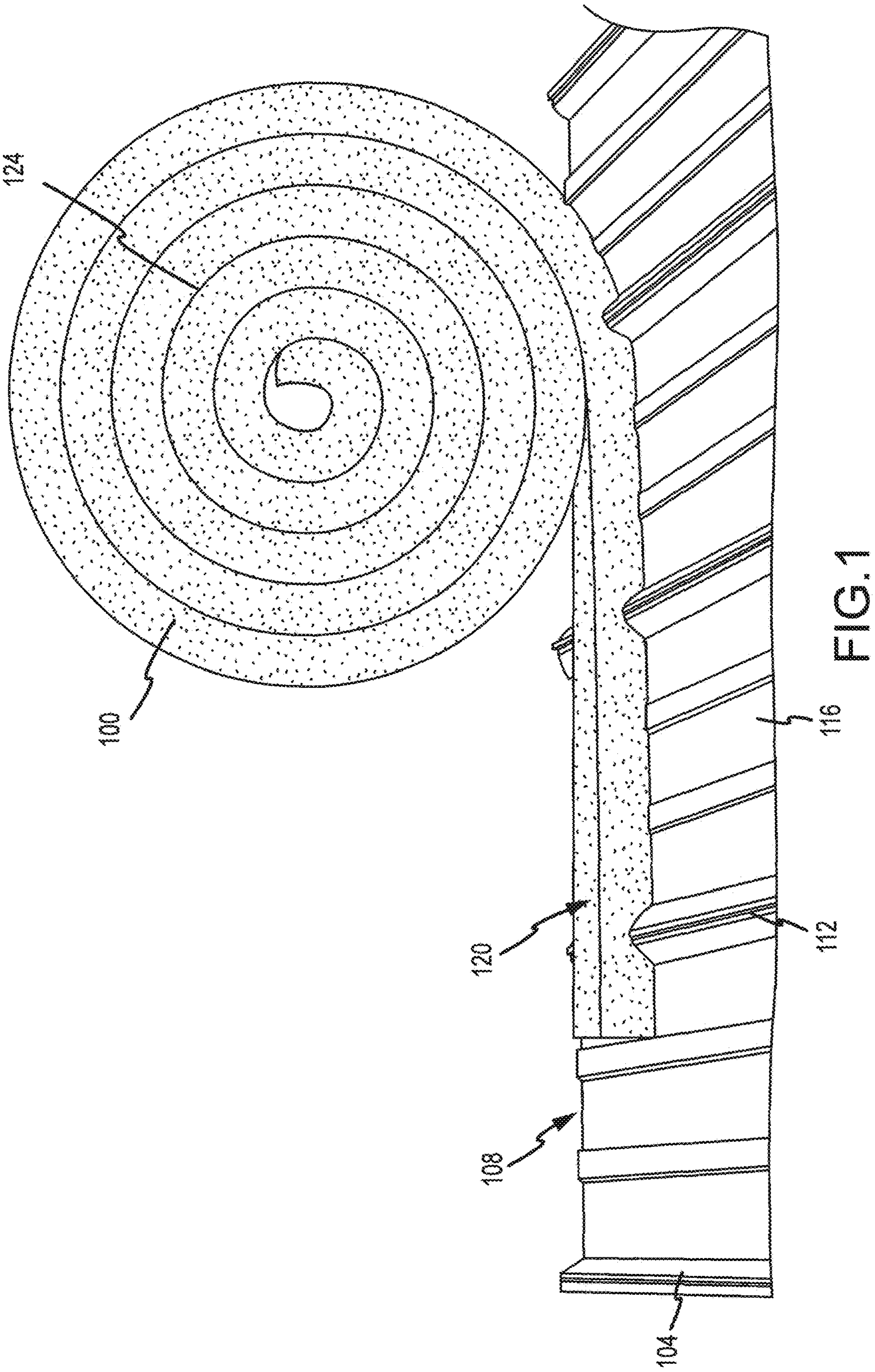
FIG. 1 is an illustration of a roofing material strip in accordance with embodiments disclosed herein.

The present disclosure provides formulations for, and methods of making and using, a roof ridge vent material having no or a low amount of formaldehyde. The disclosed roofing compositions for ridge vent materials include a polyester fiber, an acrylic emulsion, a fire retardant, a surfactant, a defoaming agent, and water. The compositions may include additional components such as a pigment. The presently disclosed compositions include no or a low amount of formaldehyde, which may be less than amounts of formaldehyde in known roofing compositions.

Roofing Compositions

The disclosed roofing compositions include at least one polyester fiber and a binder mix.

A. Polyester Fiber

The polyester fiber may be virgin polyester fiber. The polyester fiber may be nonwoven. The polyester fiber may be a polyester staple. One example of a suitable polyester fiber is a polyester staple virgin nonwoven fiber (Poole Co., Greenville, SC).

In some embodiments, the polyester fiber is included at about 25% to about 65%, about 25% to about 60%, about 25% to about 55%, about 25% to about 50%, about 25% to about 45%, about 25% to about 40%, about 25% to about 35%, about 30% to about 65%, about 35% to about 65%, about 40% to about 65%, about 45% to about 65%, about 50% to about 65%, about 55% to about 65%, about 30% to about 60%, or about 35% to about 55% by total weight of the composition. In one example, the polyester fiber is included at about 32% by total weight of the composition.

B. Binder Mix

The binder mix of the roofing composition includes an acrylic emulsion, a fire retardant, a surfactant, a defoaming agent, and water. The binder mix may include additional components.

The binder mix includes at least one acrylic emulsion. The acrylic emulsion may be anionic. The acrylic emulsion may be a self-crosslinking binder. The acrylic emulsion may include no or low amounts of formaldehyde. For example, the acrylic emulsion may be manufactured without the addition of formaldehyde or formaldehyde generators. The acrylic emulsion may be free of alkyl phenol ethoxylates. An example of a suitable acrylic emulsion is Rhoplex™ Eco-100 Water-Borne Binder by Dow Chemical (Midland, MI).

In some embodiments, the at least one acrylic emulsion is included at about 70% to about 95%, about 70% to about 90%, about 70% to about 85%, about 70% to about 80%, about 75% to about 95%, about 80% to about 95%, about 85% to about 95%, about 75% to about 90%, or about 80% to about 85% by total weight of the binder mix. In one example, the at least one acrylic emulsion is included at about 83% by total weight of the binder mix.

In the construction and use of the disclosed roofing compositions, inclusion of an acrylic emulsion having no or low amounts of formaldehyde may result in a roofing material, made from the compositions, having no or low amounts of formaldehyde. The roofing material may have lower amounts of formaldehyde than known roofing materials.

In the construction and use of the disclosed roofing compositions, inclusion of an acrylic emulsion having no or low amounts of formaldehyde may result in a roofing material, made from the compositions, having reduced amounts of formaldehyde compared to a roofing material made from similar components except for not including the acrylic emulsion having no or low amounts of formaldehyde.

The binder mix of the roofing composition includes at least one fire (flame) retardant. The flame retardant may be any composition capable of imparting flame resistance to fibers or textiles. The flame retardant may be a thermally stable, water-soluble liquid having a density of about 1.190, a pH of about 8.0, and a flash point >212° F. An example of a suitable fire retardant is Ultrasurf Per by Polyventive (Calhoun, GA).

In some embodiments, the at least one fire retardant is included at about 2.90% to about 4.40%, about 2.90% to about 4.20%, about 2.90% to about 4.00%, about 2.90% to about 3.80%, about 2.90% to about 3.60%, about 2.90% to about 3.40%, about 3.10% to about 4.40%, about 3.30% to about 4.40%, about 3.50% to about 4.40%, about 3.70% to about 4.40%, about 2.90% to about 3.90%, about 3.10% to about 4.20%, or about 3.30% to about 4.10% by total weight of the binder mix. In one example, the at least one fire retardant is included at about 3.66% by total weight of the binder mix.

The binder mix of the roofing composition includes at least one surfactant (emulsifying agent). The surfactant may be nonionic. Nonionic surfactants may be derived from neutrally charged long-chain fatty acids. The fatty acids may be derivatives of naturally occurring oils and fats, or they may be synthetic. In some embodiments, the surfactant may include long chain polyoxyethylene or polyoxypropylene groups in fatty acid, alcohol, amide or amine molecules. These surfactants may be hydrophilic due to oxygenated side chains (i.e., polyoxyethylene or polyoxypropylene chains combined with the oil-soluble fatty acid, alcohol amine or amide component of the molecule). The surfactant may be a secondary alcohol ethoxylate, such as an alkyl phenol ethoxylate, which may be a nonyl phenol ethoxylate. An example of a suitable nonionic surfactant is Tergitol™ NP-9 by Dow Chemical Co. (Midland, MI).

In some embodiments, the at least one surfactant is included at about 0.016% to about 0.024%, about 0.016% to about 0.022%, about 0.016% to about 0.020%, about 0.016% to about 0.018%, about 0.018% to about 0.024%, about 0.020% to about 0.024%, about 0.022% to about 0.024%, or about 0.018% to about 0.022% by total weight of the binder mix. In one example, the at least one surfactant is included at about 0.02% by total weight of the binder mix.

The binder mix of the roofing composition includes at least one defoaming agent (defoamer). The defoamer may be a water-based emulsion of wax and mineral oil. An example of a suitable defoaming agent is Additol® XW 376 by Allnex Chemicals (Alpharetta, GA).

In some embodiments, the at least one defoaming agent is included at about 0.024% to about 0.036%, about 0.024% to about 0.034%, about 0.024% to about 0.032%, about 0.024% to about 0.030%, about 0.024% to about 0.028%, about 0.026% to about 0.036%, about 0.028% to about 0.036%, about 0.030% to about 0.036%, about 0.032% to about 0.032%, about 0.026% to about 0.034%, or about 0.028% to about 0.032%, by total weight of the binder mix. In one example, the at least one defoaming agent is included at about 0.03% by total weight of the binder mix.

The binder mix of the roofing composition includes water. Water may be added to the other binding mix components until the total desired volume or weight of the binder mix is reached. In some embodiments, water is included at about 10% to about 16%, about 10% to about 15%, about 10% to about 14%, about 10% to about 13%, about 10% to about 12%, about 11% to about 16%, about 12% to about 16%, about 13% to about 16%, about 14% to about 16%, about 11% to about 15%, or about 12% to about 14% by total weight of the binder mix. In one example, water is included at about 13% by total weight of the binder mix.

The binder mix of the roofing composition may include one or more additional components, such as pigments. A pigment may be any desired color. An example of a black pigment is Astro Black 43 (Astro American Chemical, Fountain Inn, SC).

In some embodiments, at least one pigment is included at about 0.30% to about 0.45%, about 0.30% to about 0.43%, about 0.30% to about 0.41%, about 0.30% to about 0.39%, about 0.30% to about 0.37%, about 0.30% to about 0.35%, about 0.32% to about 0.45%, about 0.34% to about 0.45%, about 0.36% to about 0.45%, about 0.38% to about 0.45%, about 0.40% to about 0.45%, about 0.30% to about 0.45%, about 0.32% to about 0.43%, about 0.34% to about 0.41%, or about 0.36% to about 0.39% by total weight of the binder mix. In one example, pigment is included at about 0.38% by total weight of the binder mix.

The roofing composition may be free of one or more components that are present in known roofing compositions. For example, the roofing composition may be free of a terpolymer, such as a terpolymer of vinyl chloride, vinyl acetate, and ethylene. The roofing composition may be free of a crosslinking agent or crosslinking resin. The roofing composition may be free of ammonia or an ammonia derivative.

In the construction and use of the disclosed roofing compositions, exclusion of a terpolymer, such as a terpolymer of vinyl chloride, vinyl acetate, and ethylene, may result in a roofing material, made from the compositions, having no or low amounts of formaldehyde. The roofing material may have lower amounts of formaldehyde than known roofing materials, such as those that include a terpolymer.

In the construction and use of the disclosed roofing compositions, exclusion of a crosslinking agent or crosslinking resin may result in a roofing material, made from the compositions, having no or low amounts of formaldehyde.

The roofing material may have lower amounts of formaldehyde than known roofing materials, such as those that include a crosslinking agent or crosslinking resin.

In the construction and use of the disclosed roofing compositions, exclusion of ammonia or an ammonia derivative may result in a roofing material, made from the compositions, having no or low amounts of formaldehyde. The roofing material may have lower amounts of formaldehyde than known roofing materials, such as those that include ammonia or an ammonia derivative.

Preparing Roofing Materials

The disclosed compositions may be formed into roof ridge vent materials. The polyester fibers may be opened and blended, then randomly aligned into a web by airflow. The binder mix may then be applied to the web. The treated web may then oven-cured to bind the fibers into a relatively rigid mat having a significant porous area between the random fibers.

The resulting material is a non-woven, non-wicking matting of randomly oriented interconnected or reticulated fibers. The material exhibits desirable properties such as strength; durability, such as against ultraviolet light-induced deterioration; compression resistance, such as under a ridge cap; air permeability; a barrier to water, such as wind-driven rain; and a barrier to insects. The air permeability of the material may be about 680 $ft^3$/min to about 880 $ft^3$/min, about 680 $ft^3$/min to about 840 $ft^3$/min, about 680 $ft^3$/min to about 800 $ft^3$/min, about 720 $ft^3$/min to about 880 $ft^3$/min, about 760 $ft^3$/min to about 880 $ft^3$/min, or about 760 $ft^3$/min to about 800 $ft^3$/min.

The material may be formed into any shape, such as a strip, sheet, mat, or block. Once formed, the resulting material may be cut as desired, such as in to strips, inserts, or custom shapes to, for example, be complimentary to or mate with components of a roof. The formed material may be used as a venting material, such as a ridge vent for use with a metal roof. The formed material may be suitable for engaging both a ridge cap and the roof. For example, the formed material may have at least one major longitudinal surface that is flat, planar, and capable of continuously engaging a flat ridge cap without modification to the formed material, such as without compressing the material. Additionally or alternatively, the at least one flat, planar longitudinal surface is capable of expanding or remaining the same size to continuously or substantially continuously maintain contact with a ridged roof surface. In some examples, the formed material has at least one major longitudinal surface with a variable profile such that, when compared to a given plane, some portions of the profile fall above the plane and/or some portions fall below the plane. The variable profile may be complimentary to a ridged or uneven roof surface without modification of the formed material, such as without compressing the material. The variable surface profile may be on a side or face of the formed material opposite a side or face having a flat, planar surface. The venting material, regardless of having a planar surface, a non-planar surface, or both, may have a low profile.

In some embodiments, the presently disclosed formed material may be combined with one or more other materials to produce a combination venting material product. Each material may help provide various features or benefits to the resulting product, such as optimized fit with a roof, increased ventilation, improved durability of the product, or easier installation of the product. One or more of the materials may be suitable for engaging a roof surface. One or more of the materials may be suitable for engaging a ridge cap. In an example, the disclosed material may be combined with a foam, such as a cross-linked polyethylene foam of two-pound density, to form a venting material. Either or both of the disclosed material and the foam may be suitable for engaging a ridge cap. In such combination products, the foam may be suitable for engaging a roof surface.

The disclosed material includes no or a low amount of formaldehyde. In some embodiments, the amount of formaldehyde in or released from the material is about 0 ppm to about 16 ppm, about 0 ppm to about 14 ppm, about 0 ppm to about 12 ppm, about 0 ppm to about 10 ppm, about 0 ppm to about 8 ppm, about 0 ppm to about 6 ppm, about 2 ppm to about 16 ppm, about 4 ppm to about 16 ppm, about 6 ppm to about 16 ppm, about 8 ppm to about 16 ppm, about 10 ppm to about 16 ppm, about 4 ppm to about 15 ppm, or about 6 ppm to about 14 ppm. In one example, the amount of formaldehyde in or released from the material is about 13 ppm.

The disclosed material includes significantly less formaldehyde than known roofing materials. With reference to Example 2, the presently disclosed material includes about 1% the amount of formaldehyde as known roofing materials. The presently disclosed material may demonstrate about a 99% reduction in formaldehyde compared to known roofing materials.

Using Roofing Materials

The disclosed roofing materials may be applied to a roof system to, for example, provide ventilation, exclude water, and exclude pests. The roof system may include a ridge vent and an air permeable sealant system provided, at least in part, by the disclosed roofing materials.

As shown in FIG. 1, a strip 100 of a roofing material prepared in accordance with embodiments disclosed herein may be installed along a roof panel 104 having an uneven surface 108. By way of example and not limitation, the roof panel 104 may be a corrugated sheet. The strip 100 may be installed across both raised 112 and recessed 116 portions of the uneven surface 108. Across the raised portions 112, the strip 100 compresses and forms around the surface 108. Across the recessed portions 116, the strip 100 may expand or remain the same size to keep in contact with the surface 108. In this way, continuous contact is maintained between the strip 100 and both raised 112 and recessed 116 portions of the uneven surface 108. This continuous contact is maintained without dividing the strip 100 into separate segments that are dedicated to engaging different portions of an uneven surface 108.

As shown in FIG. 1, the strip 100 may be wound into a coil for packaging and delivery. One side of the strip may include an adhesive substance 120, such as glue. The adhesive substance 120 may be arranged on the surface of the strip 100 in a single or double bead layer. In one embodiment, the adhesive substance 120 is a M63 hot melt adhesive. The adhesive substance 120 may be applied on one or two sides of the strip 100. In use, the adhesive substance 120 provides a mechanism for the strip 120 to be attached to a particular surface. Specifically, the strip 100 may be unwound from its coiled orientation and progressively applied to a desired location on a roof panel or other surface. The adhesive substance 120 is adapted to form a tight seal between the strip 100 and a particular surface, even when installed in bad weather conditions. The strip 100 may be wound together with an elongated paper 124 or other material that prevents the adhesive substance 120 from adhering to an adjacent side of the strip 100.

Figure 2:
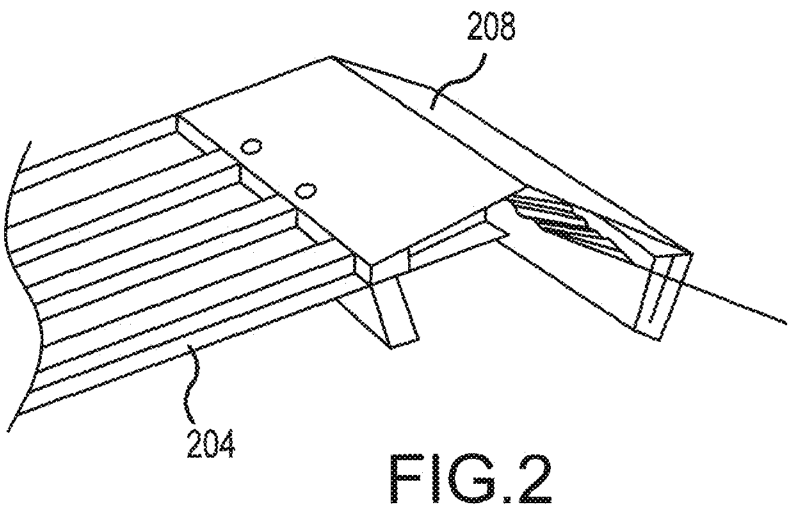
FIG. 2 is an illustration of the roofing material strip of FIG. 1 installed with a ridge cap.

As shown in FIG. 2, the strip 100 may be installed between major and minor roof panels in a ridge portion of a roof. Specifically, the strip 100 may be deployed as a seal between a corrugated sheet 204 (major roof panel) and a ridge cap 208 (minor roof panel). The strip 100 provides a tight seal between the uneven surface of the corrugated sheet 204 and the ridge cap 208. The material that makes up the strip 100 allows for air to pass through the strip 100, thereby allowing ventilation to occur between the corrugated sheet 204 and the ridge cap 208.

The strip 100 may be installed at an intake or an exhaust portion of a roof ventilation system, such as the ridge cap location shown in FIG. 2. The use of polyester fibers in the strip 100 prevents water or moisture from being wicked into the strip 100. By preventing moisture from accumulating in the strip 100, the strip 100 is prevented from freezing. If the strip 100 were allowed to freeze, it could lose its air-permeability and cease to function as a ventilation component. In connection with the roof cap installation shown in FIG. 2, the strip 100 may be adapted to provide a low profile or an otherwise inconspicuous appearance. In one embodiment, the strip 100 may be sized to seal an approximate one- to two-inch gap between the corrugated sheet 204 and the ridge cap 208. Specifically, the strip 100 may have an inch and one-half of nominal thickness, three inches of width and a twenty foot length.

Figure 3:
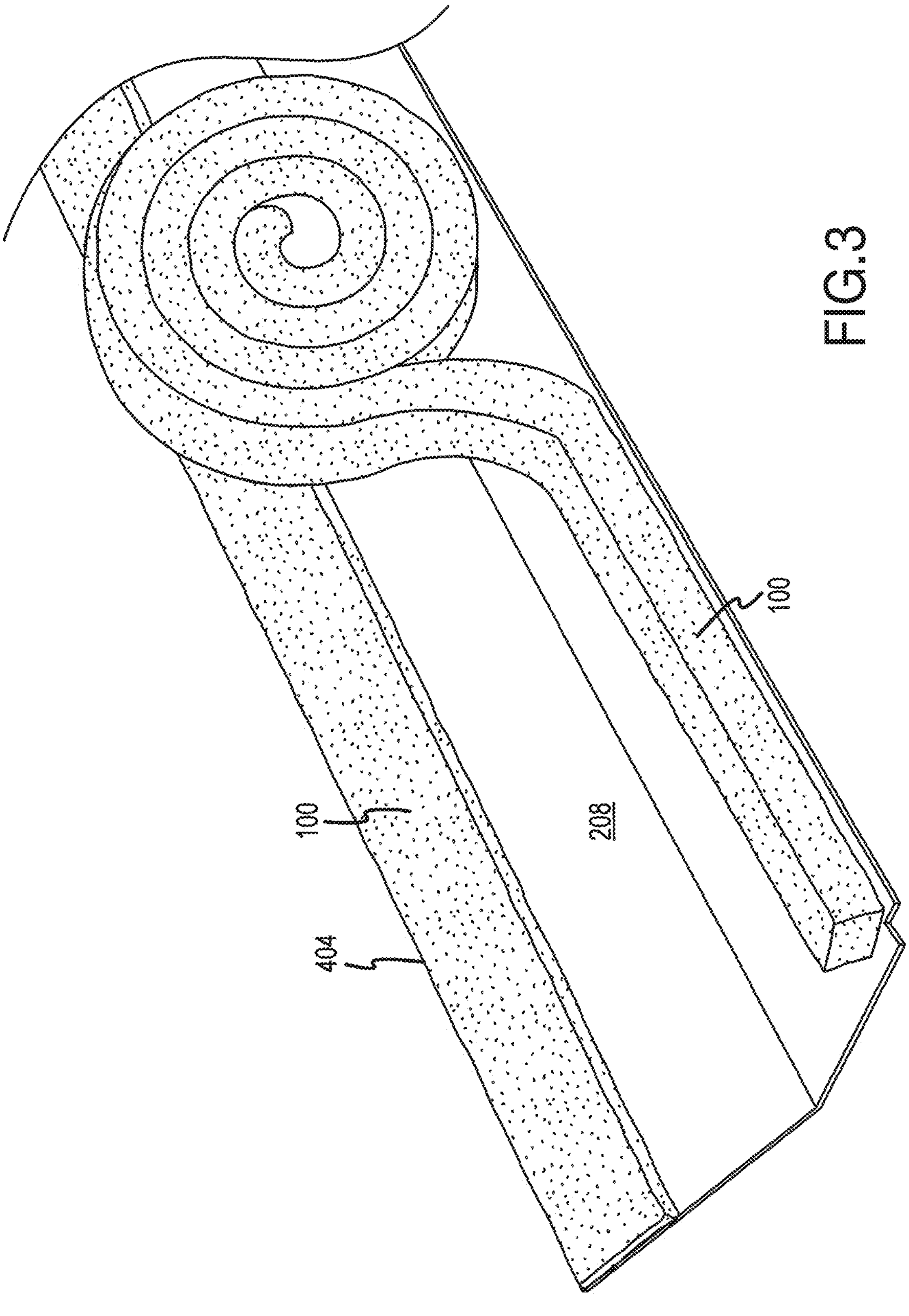
FIG. 3 is an illustration of the roofing material strip of FIG. 1 installed on an inverted ridge cap.

FIG. 3 is an illustration of the underside of a ridge cap 208. During an installation process, the ridge cap 208 may be inverted and placed on the ground or other surface. In this orientation, one or more strips 100 may be unrolled and attached to the underside of the inverted ridge cap 208. As shown in FIG. 3, a strip 100 may be attached by use of the adhesive substance 120 to a portion of the underside of the inverted ridge cap 208 that is proximate to an edge 404 of the ridge cap 208. With the strip 100 installed or attached as shown in FIG. 3, the ridge cap 208 may be maneuvered into place at the appropriate location on the top of the roof. With the ridge cap installed at appropriate location, the strip 100 may form to fit irregularities or uneven portions of a surface of a major roof panel. The strip 100 may include an adhesive 120 that attaches the strip 100 to the major roof panel. Alternatively, the seal to the roof may be achieved through the use of adhesive between the strip and the roof cap only.

Figure 4:
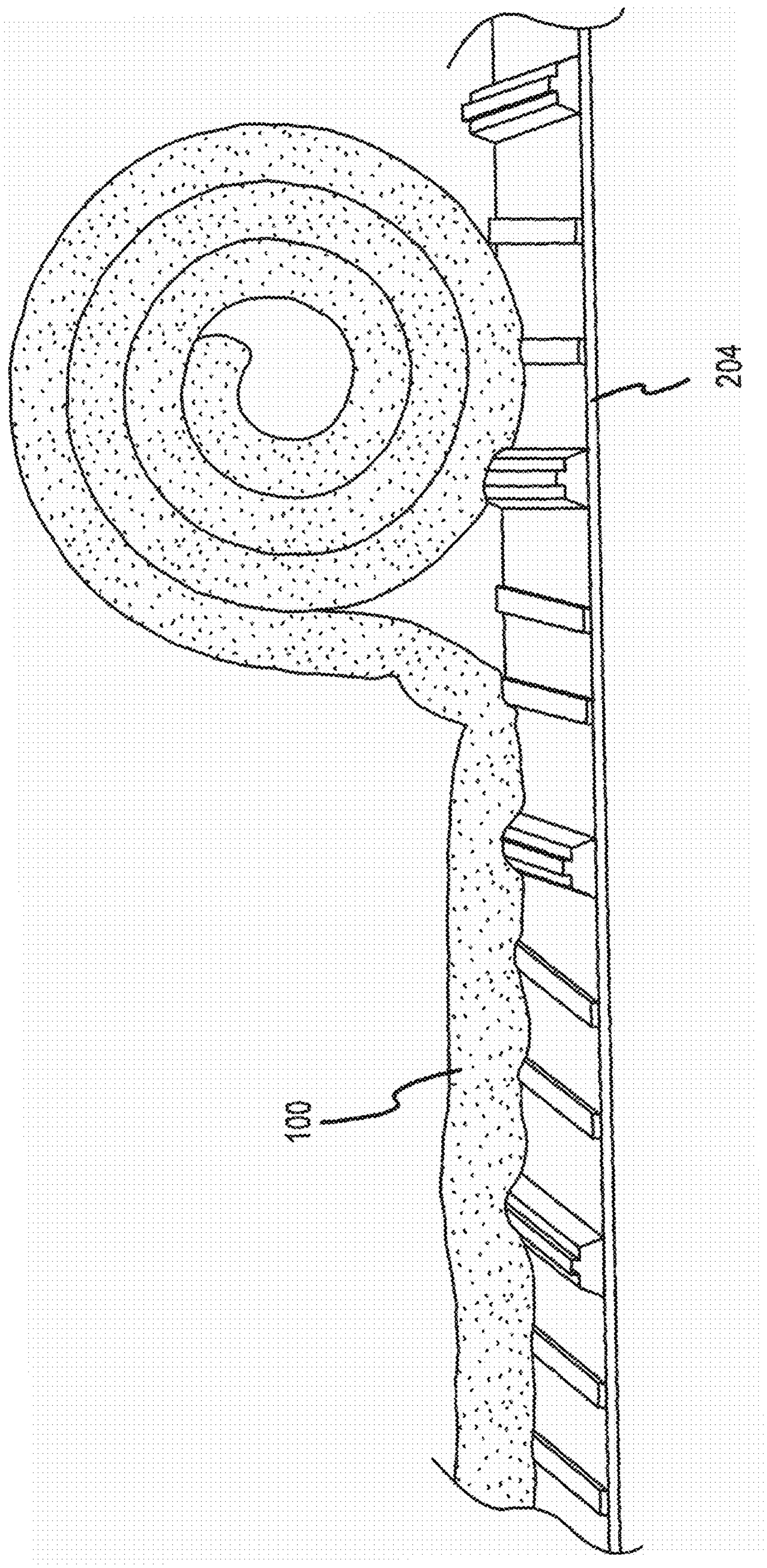
FIG. 4 is an illustration of the roofing material strip of FIG. 1 installed on a major roof panel.

FIG. 4 is an illustration of an installation of strip 100 on a major roof panel. Specifically, the strip 100 is unrolled with the adhesive substance 120 facing downward. The strip 100 is thereby attached or connected to the major roof panel 204. The strip 100 may be applied to the major roof panel 204 corresponding to a location that will overlap with a ridge cap 208 when the ridge cap 208 is installed at its appropriate location. Alternatively, the strip 100 may be installed at a slightly upslope location from an edge of the ridge cap 208 when the ridge cap 208 is installed at its appropriate location.

Whether the strip 100 is initially installed on the major or minor roof panels, the minor roof panel may be secured to the major roof panel using an appropriate tool. In one embodiment, a 3300 RPM screw gun may be used. The strip 100 is adapted for easy installation. Specifically, a utility knife or scissors may be used to cut the strip to ensure the strip 100 conforms to the desired length. The strip 100 may be caulked without a connector or end plugs. Multiple strips 100 may be used in combination to form a ventilation strip of any size. Adjacent strips 100 may be "butt-fit" such that end portions of the strips are in contact.

Figure 6:
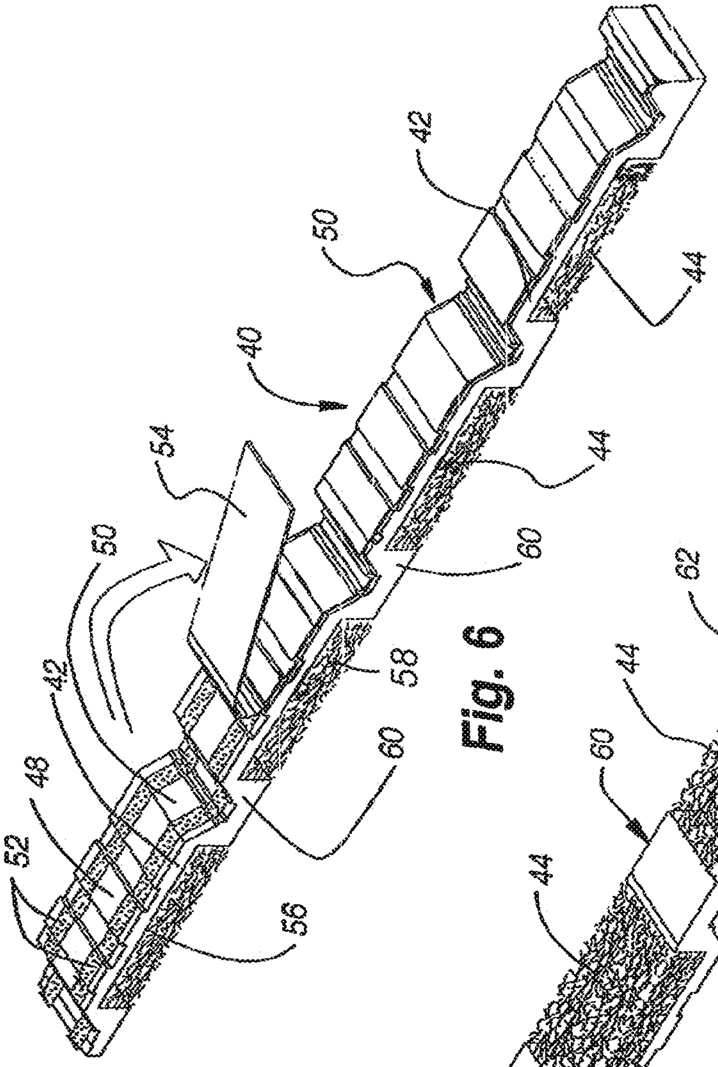
FIG. 6 is an isometric view of the roofing material strip of FIG. 6, looking at the bottom of the strip and the removal of tear-away paper overlying adhesive.
Figure 5:
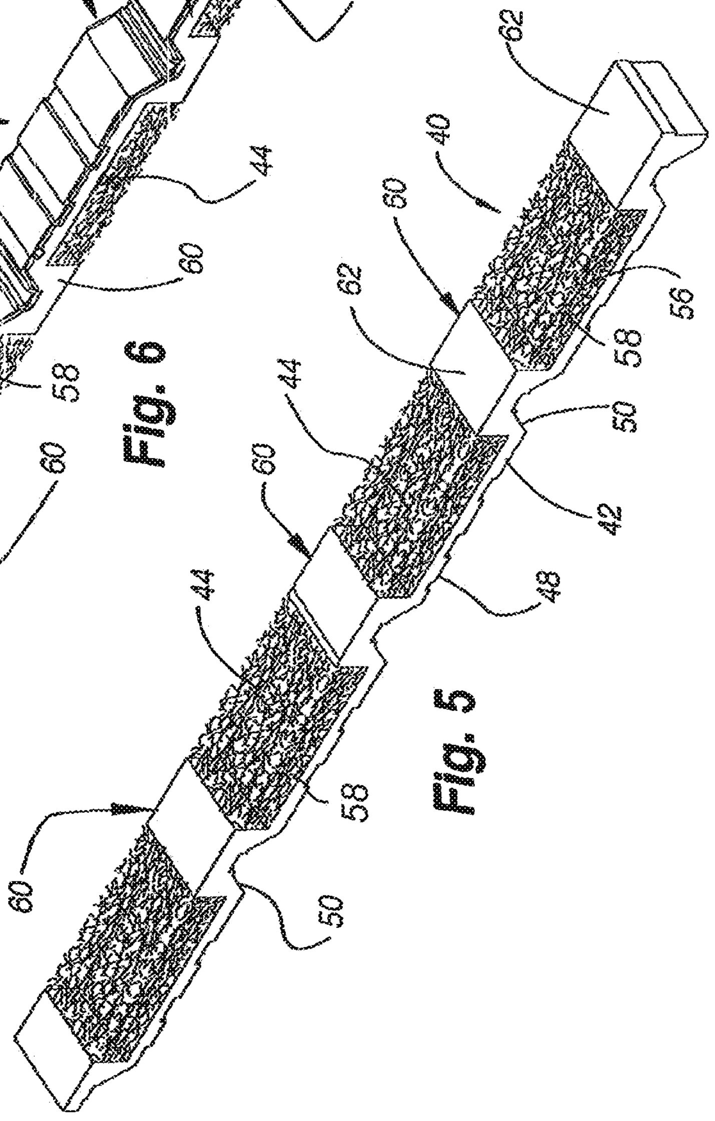
FIG. 5 is an isometric view of a roofing material strip, looking downward on the top of the strip, in accordance with embodiments disclosed herein.

In some embodiments, and with reference to FIGS. 5 and 6, the disclosed roofing material is incorporated into a roofing strip 40. The strip 40 is a composite strip of two aggregated or interconnected materials with one base material 42 forming the base of the strip, and the presently disclosed roofing material 44 as an overlying material seated on top of the base. The base material 42 may be a flexible material that is also air and liquid impermeable, such as a cross-linked polyethylene foam of two-pound density. The base material has a lower surface 48 that is adapted to engage an underlying surface, such as a roof section to which the strip 40 is applied. The lower surface 48 may be smooth but provided with transverse channels 50 having a trapezoidal cross-sectional configuration complementary to the raised portions 112 of a roof panel 104. In this manner, when the strip 40 is applied to a roof panel 104, the strip 40 is in continuous engagement with the raised portions 112 and the recessed portions 116 of the roof panel 104. The base material 42 has a smooth bottom surface such that the strip 40 can be sealed to the underlying roof panel 104 to prevent the passage of fluid, insects, and the like across the interconnection of the strip 40 with the roof panel 104.

The strip 40 may include a pair of longitudinally extending strips 52 of adhesive, as seen in FIG. 6, which are spaced from each other and covered with a tear-away strip 54 of paper, which facilitates shipping of the material and easy installation.

With reference to FIG. 5, an upper surface 56 of the base material 42 is provided with longitudinally spaced notches or recesses 58 of rectangular transverse cross-section that are spaced from each other by bridge sections 60 of the base material 42. The bridge sections 60 of the base material 42 have flat, continuous upper or top surfaces 62 for engagement with a ridge cap 208. The presently disclosed roofing material 44 is positioned in the recesses 58 in the upper surface 56 of the base material 42.

The roofing material 44 may be positively secured in the recesses 58 of the base material 42 with adhesive or the like and is of a thickness such that the top surface of the roofing material 44 is coplanar with the top surface 62 of the bridge sections 60 in the base material 42. Accordingly, the cross-section of the roofing material corresponds with the cross-section of the recesses in the base material.

Due to the continuous height of the strip material, the ridge cap 208 is positioned in continuous engagement with the strip 40. The ridge cap 208 can be secured in position with fasteners, which may be passed through the ridge cap 208, the bridge section 60 of the base material 42, and into the raised portions 112 of the roof panel 104.

Figure 8:
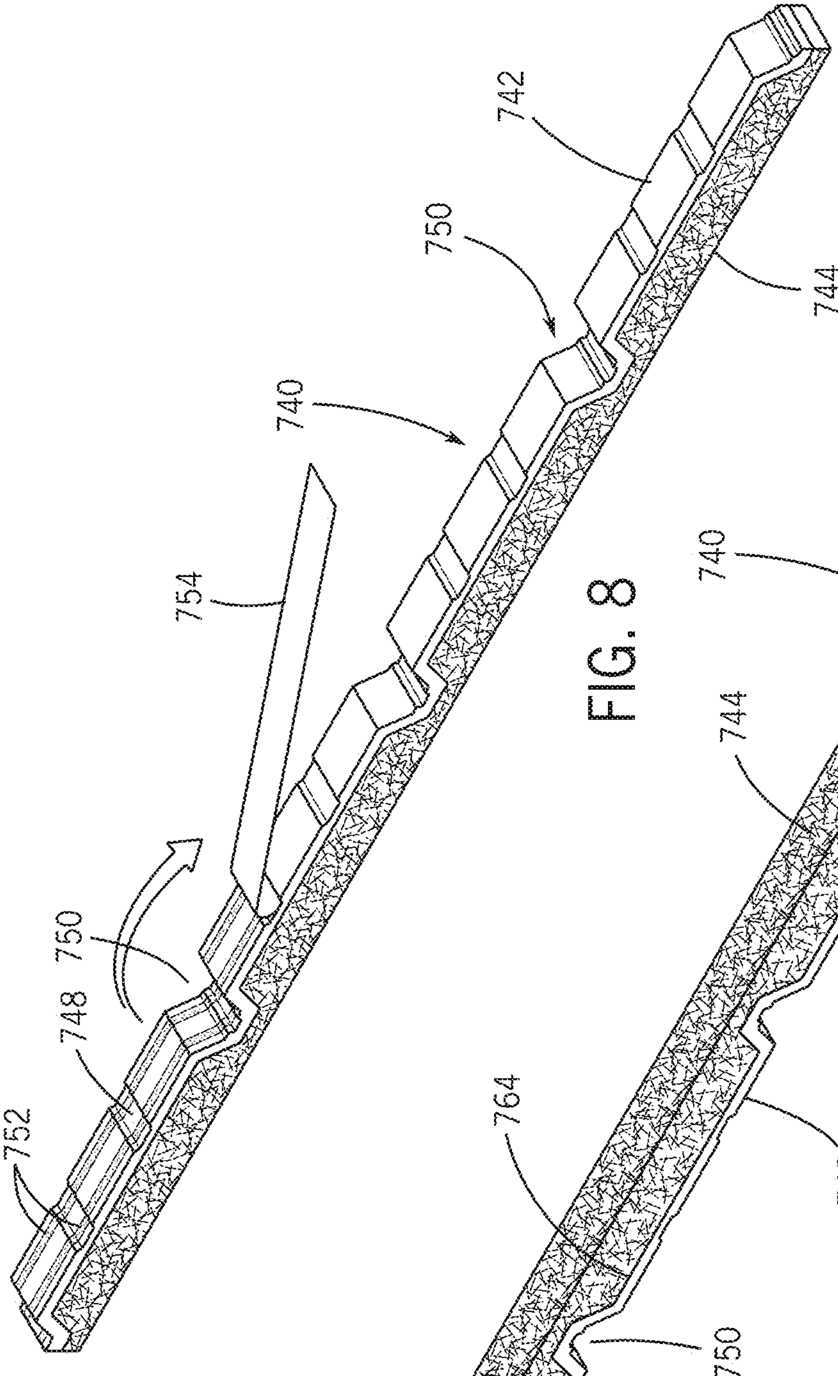
FIG. 8 is an isometric view of the roofing material strip of FIG. 7, looking at the bottom of the strip and the removal of tear-away paper overlying adhesive.
Figure 7:
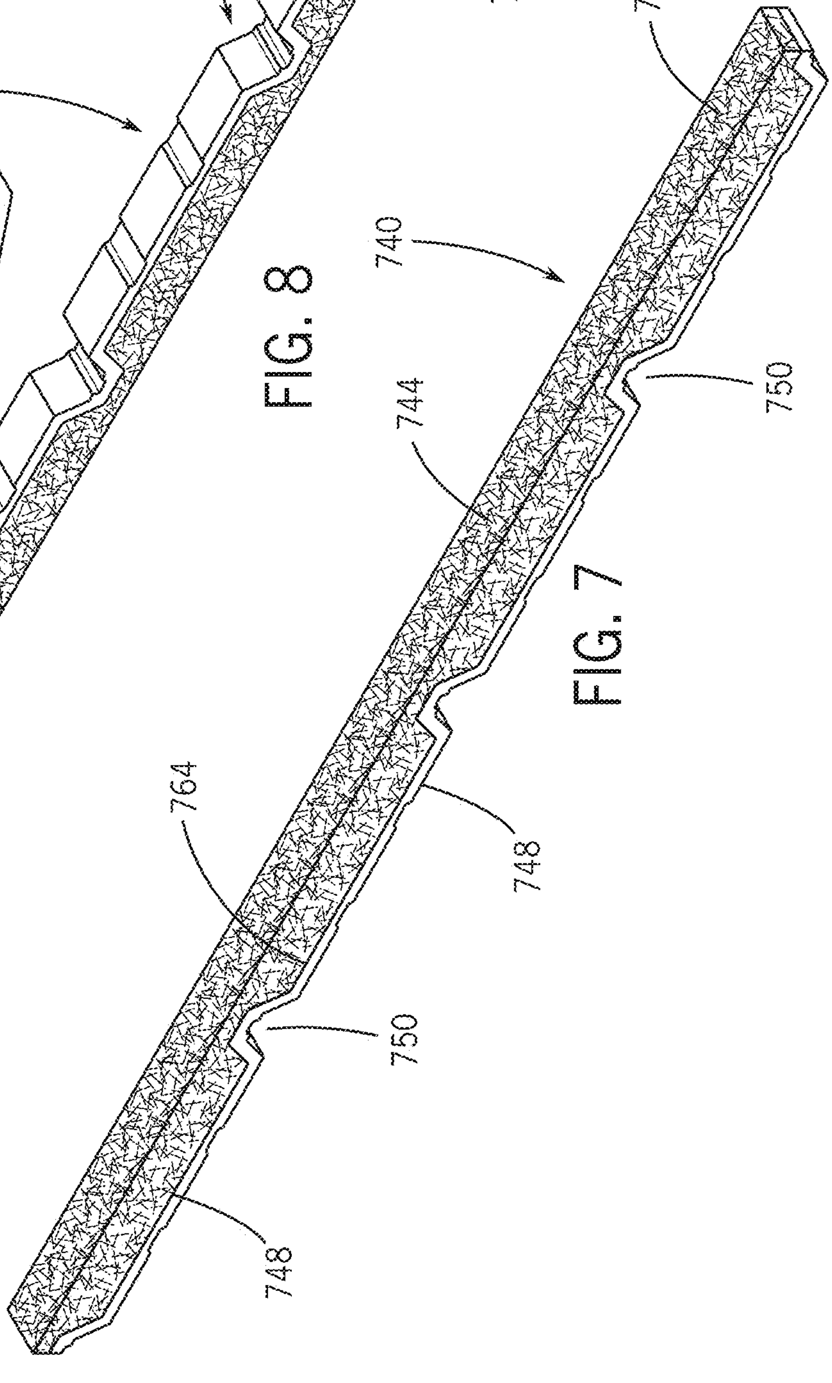
FIG. 7 is an isometric view of a roofing material strip, looking downward on the top of the strip, in accordance with embodiments disclosed herein.

In some embodiments, and with reference to FIGS. 7 and 8, the disclosed material is incorporated into a roofing strip 740. The strip 740 is a composite strip of two aggregated or interconnected materials with one base material 742 forming the base of the strip, and the presently disclosed roofing material 744 as an overlying material seated on top of the base. The base material 742 may be a flexible material that is also air and liquid impermeable, such as a cross-linked polyethylene foam of two-pound density. The base material 742 has a lower surface 748 that is adapted to engage an underlying surface, such as a roof section to which the strip 740 is applied. The lower surface 748 may be smooth but provided with transverse channels 750 having a trapezoidal cross-sectional configuration complementary to the raised portions 112 of a roof panel 104. In this manner, when the strip 740 is applied to a roof panel 104, the strip 740 is in continuous engagement with the raised portions 112 and the recessed portions 116 of the roof panel 104. The base material 742 has a smooth bottom surface such that the strip 740 can be sealed to the underlying roof panel 104 to prevent the passage of fluid, insects, and the like across the interconnection of the strip 740 with the roof panel 104.

An upper surface 756 of the base material 742 is provided with longitudinally spaced recesses 758 that are spaced from each other by bridge sections 760 of the base material 742. The presently disclosed roofing material 744 is positioned adjacent the upper surface 756 of the base material 742. The roofing material 744 is seated in the recesses 758 and traverses the bridge sections 760. A bottom surface 764 of the roofing material 744 may be positively secured to the top surface 756 of the base material 742, such as in the recesses 758 and/or across the bridge sections 760, with an adhesive or the like. The bottom surface 764 of the roofing material has a profile complimentary to the profile of the top surface 756 of the base material 742.

The strip 740 may include a pair of longitudinally extending strips 752 of adhesive, as seen in FIG. 8, which are spaced from each other and covered with a tear-away strip 754 of paper, which facilitates shipping of the material and easy installation.

The top surface 762 of the roofing material 744 forms a flat, continuous surface for engaging a ridge cap 208 such that the ridge cap 208 is positioned in continuous engagement with the strip 740. The ridge cap 208 can be secured in position with fasteners, which may be passed through the ridge cap 208 and into the raised portions 112 of the roof panel 104.

Figure 10:
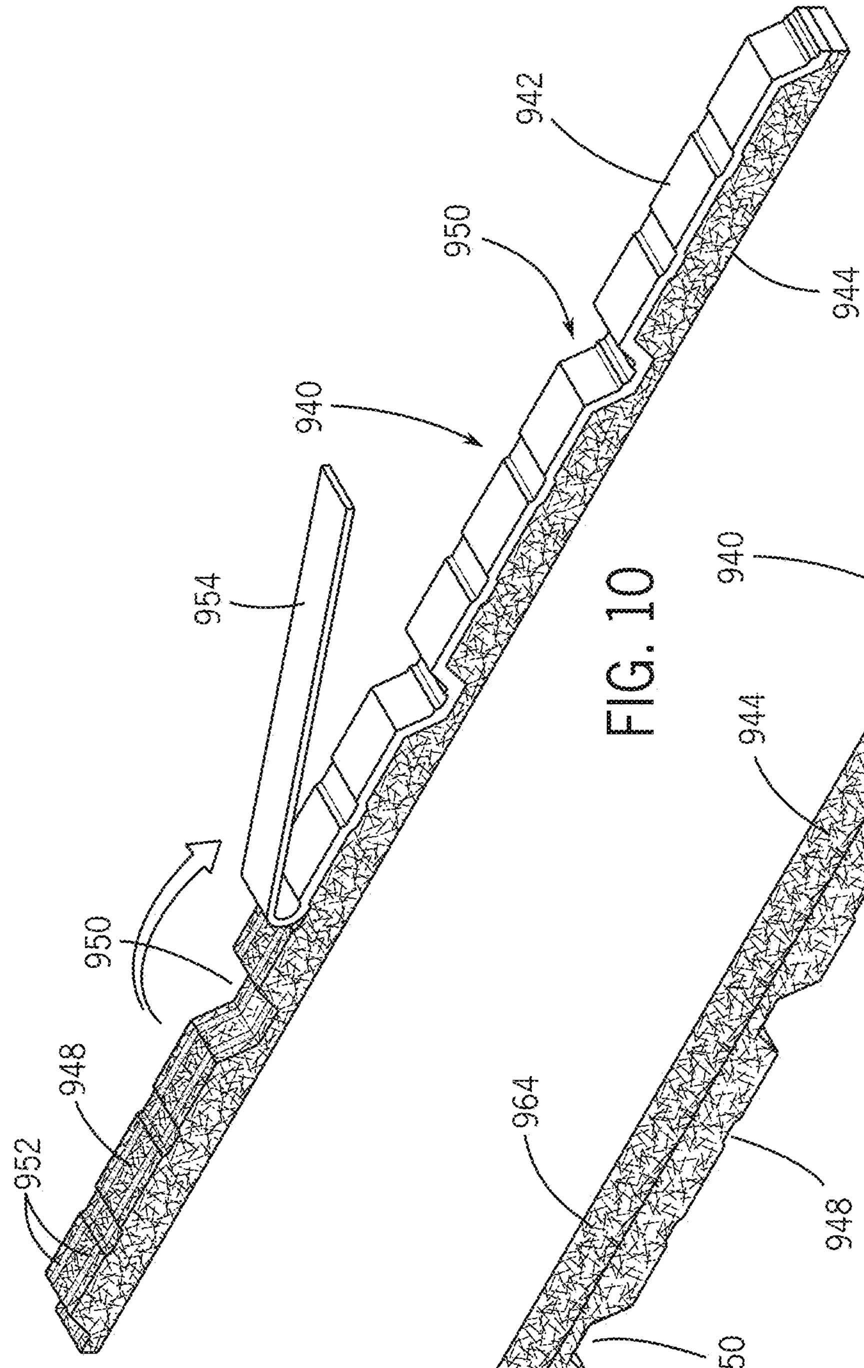
FIG. 10 is an isometric view of the roofing material strip of FIG. 9, looking at the bottom of the strip and the removal of tear-away paper overlying adhesive.
Figure 9:
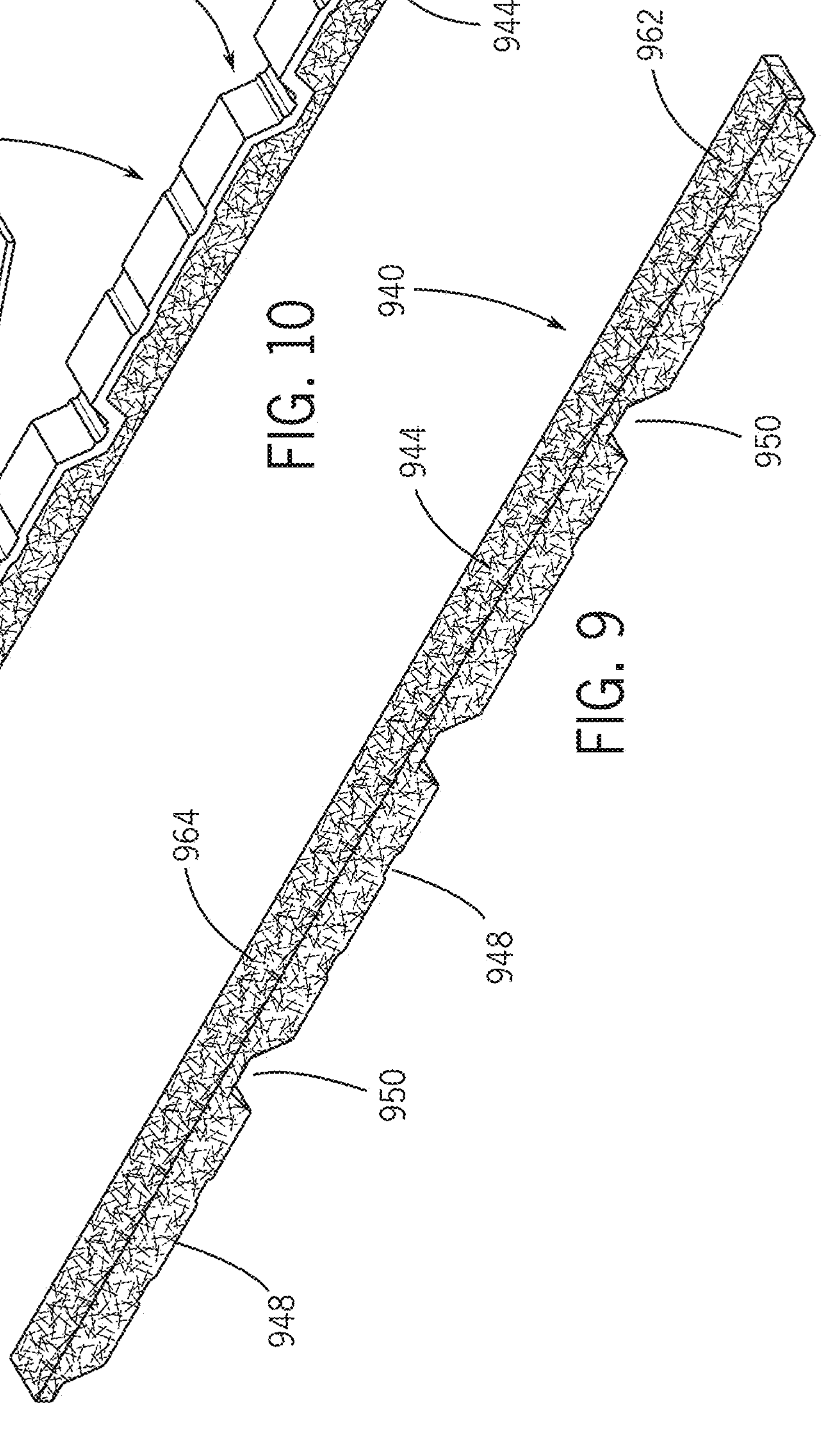
FIG. 9 is an isometric view of a roofing material strip, looking downwardly on the top of the strip, in accordance with embodiments disclosed herein.

In some embodiments, and with reference to FIGS. 9 and 10, the disclosed roofing material 944 is incorporated into a roofing strip 940. The strip 940 has a lower surface 948 that is adapted to engage an underlying surface, such as a roof section to which the strip 940 is applied. The lower surface 948 may be provided with transverse channels 950 having a cross-sectional configuration complementary to or approximately complementary to the raised portions 112 of a roof panel 104. In this manner, when the strip 940 is applied to a roof panel 104, the strip 940 is in continuous or substantially continuous engagement with the raised portions 112 and the recessed portions 116 of the roof panel 104. The strip 940 can be sealed to the underlying roof panel 104 to prevent the passage of fluid, insects, and the like across the interconnection of the strip 940 with the roof panel 104.

The strip 940 may include a pair of longitudinally extending strips 952 of adhesive, as seen in FIG. 10, which are spaced from each other and covered with a tear-away strip 954 of paper, which facilitates shipping of the material and easy installation.

The top surface 962 of the strip 940 is relatively flat and forms an even, continuous surface for engaging a ridge cap 208 such that the ridge cap 208 is positioned in continuous engagement with the strip 940. The ridge cap 208 can be secured in position with fasteners, which may be passed through the ridge cap 208 and into the raised portions 112 of the roof panel 104.

Figure 11:
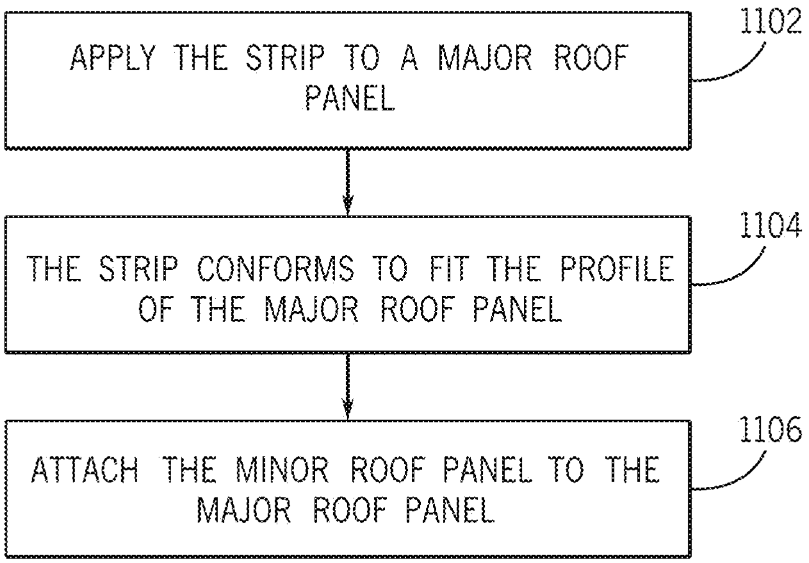
FIG. 11 is a flow chart illustrating a method according to embodiments disclosed herein.

In some implementations, methods of installing the strips 100, 40 include the steps illustrated in the flow chart of FIG. 11. First, at 1102, the strip 100, 40, 740, 940 is applied to a major roof panel, such as a roof panel 104. An example of this installation is shown in FIG. 4. Next, in 1104, the strip 100, 40, 740, 940 conforms to fit the profile of the major roof panel. For example, the roofing material of the strip 100, 940 may compresses around raised portions of a major roof panel. The material may expand or remain the same size to keep in contact with the recessed portions of the major roof panel. As another example, the profile of the lower surface 48, 748 of the base material 42, 742 of the strip 40, 740, or the lower surface 948 of the strip 940, may mate with the raised and recessed portions of the major roof panel. In 1106, a minor roof panel is attached to the major roof panel. By conforming to the irregularities of the major roof panel, the strip 100, 40, 740, 940 may provide a seal between the major and minor roof panels. An examples of this installation configuration is shown in FIG. 2.

Figure 12:
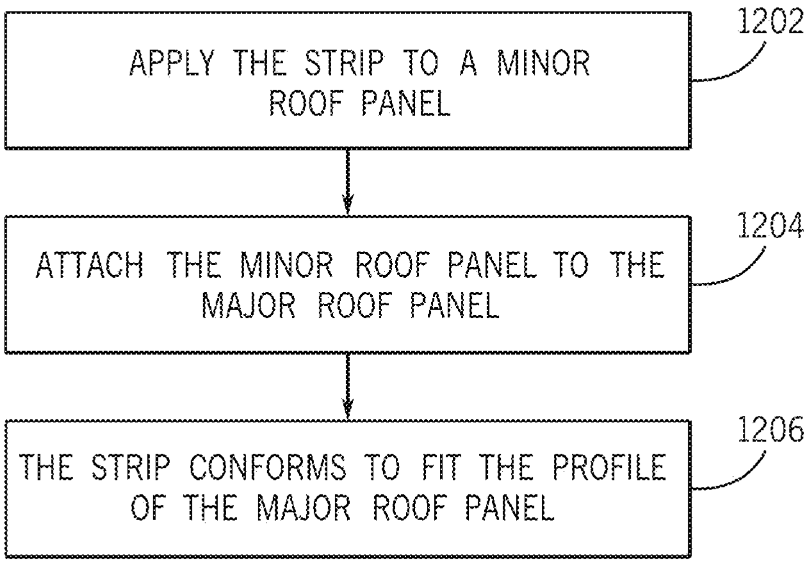
FIG. 12 is a flow chart illustrating a method according to embodiments disclosed herein.

In some implementations, methods of installing the strips 100, 40, 740, 940 include the steps illustrated in the flow chart of FIG. 12. First, at 1202, the strip 100, 40, 740, 940 is applied to a minor roof panel, such as a ridge cap 208. Specifically, the strip 100, 40, 740, 940 may be applied proximate to the edge of the ridge cap or other minor roof panel when the ridge cap is positioned in an inverted orientation. An example of this installation is shown in FIG. 3. Next, in 1204, a minor roof panel is attached to the major roof panel. In 1206, the strip 100, 40, 740, 940 conforms to fit the profile of the major roof panel. For example, the roofing material of the strip 100, 940 may compresses around raised portions of a major roof panel. The material may expand or remain the same size to keep in contact with the recessed portions of the major roof panel. As another example, the profile of the lower surface 48, 748 of the base material 42, 742 of the strip 40, 740, or the lower surface 948 of the strip 940, may mate with the raised and recessed portions of the major roof panel. By conforming to the irregularities of the major roof panel, the strip 100, 40, 740, 940 may provide a seal between the major and minor roof panels.

By way of example and not limitation, the embodiments illustrated herein include a minor roof panel having a smooth surface and major roof panel having an uneven surface. It should be appreciated that other roof configurations may be used in connection with the strip 100, 40. Specifically, the strip 100, 40 may be installed with a minor roof panel having an uneven surface and a major roof panel having a smooth surface.

Regardless of the installation method used (e.g., FIG. 11, 12) or form of strip 100, 40, 740, 940 used, exposure to formaldehyde is at a safe level. For example, the No Significant Risk Level under Proposition 65 in the state of California is 40 μg/day for formaldehyde. Installation results in an intake of less than 40 μg/day. With reference to Example 3, an installer may experience an estimated total daily intake of up to about 25 μg/day formaldehyde or about 23 μg/day formaldehyde, or less. With references to Examples 3 and 4, an installer of the disclosed roofing materials may experience an estimated total daily exposure to formaldehyde that is significantly lower than when installing a known roofing material. The estimated daily exposure for the disclosed material may be less than 1%, or less than 0.5%, or less than 0.25% that of the exposure when installing known roofing materials.

EXAMPLES

The following examples illustrate various aspects of the disclosure, and should not be considered limiting.

Example 1—Sample Preparation

Sample roofing materials were prepared from each of the disclosed composition ("Sample 1") and a Comparative Example—existing product Python™ Single Layer Ridge Vent (Marco Industries, Tulsa, OK). The components of each material are listed in Table 1. For Sample 1, component weight (in lbs) was subject to a Rhoplex adjustment factor of 1.2. A total batch size of 8756 linear yards was prepared for each sample. Sample 1 included the binder mix (i.e., all listed components except for the polyester staple and water) at 3.95 lb/yard; the Comparative Example included the binder mix at 3.29 lb/yard.

First, the polyester fibers were opened and blended, then randomly aligned into a web by airflow. The prepared binder mix was then applied to the web. The treated web was oven-cured to bind the fibers into a relatively rigid mat having a significant porous area between the random fibers.

TABLE 1

| | | | Sample 1 | | Comparative Example | |
|---|---|---|---|---|---|---|
| Component | Description | Manufacturer | Lbs. | % By Weight | Lbs. | % By Weight |
| Polyester staple | Polyester fiber | David C. Poole Co. | 18,602.00 | | 18,602.00 | |
| Rhoplex Eco-100 | Acrylic emulsion, ultra-low formaldehyde | Dow Chemical Co. | 32,981.16 | 82.90% | 0.00 | 0.00% |
| Vinnol CE35 | Terpolymer (vinyl chloride, vinyl acetate, ethylene) | Wacker Chemie AG | 0.00 | 0.00% | 25,928.00 | 78.21% |
| Cymel 385 | Crosslinking resin | Allnex Chemical | 0.00 | 0.00% | 1,370.30 | 4.13% |
| Astro Black 43 | Black pigment | Astro American Chemical | 151.20 | 0.38% | 126.00 | 0.38% |
| Ultrasurf Per | Fire retardant | Polymer Solutions Group | 1,456.80 | 3.66% | 1,214.00 | 3.66% |
| Ammonia | Ammonium hydroxide | CF Industries | 0.00 | 0.00% | 186.00 | 0.56% |
| Tergitol NP-9 | Surfactant | Dow Chemical Co. | 9.83 | 0.02% | 8.19 | 0.02% |
| Additol XW 376 | Defoaming agent | Allnex Chemical | 11.28 | 0.03% | 9.40 | 0.03% |
| Water | | | 5,171.65 | 13.00% | 4,310.00 | 13.00% |
| | Total (except Polyester staple): | | 39,781.92 | 100.00% | 33,151.89 | 100.00% |

Example 2—Formaldehyde Testing

Sample 1 and the Comparative Example were tested for formaldehyde content via American Association of Textile Chemists and Colorists (AATCC) Test Method 112-2008, Determination of Formaldehyde Release from Fabric: Sealed Jar Method. Sample 1 had 13.0 ppm (mg/kg) formaldehyde. The Comparative Example had 1200 ppm (mg/kg) formaldehyde.

Example 3—Compliance Testing of Sample 1

Sample 1 was evaluated for compliance with California Proposition 65 in regards to formaldehyde exposure.

A sample was subjected to a risk assessment analysis that estimated potential worker exposure to formaldehyde (CAS No. 50-00-0). Specifically, exposure to formaldehyde via inhalation, dermal, and indirect oral exposure routes was estimated. The total formaldehyde intake was compared to the No Significant Risk Level (NSRL) of 40 µg/day established for formaldehyde under California Proposition 65 (Prop 65). Due to the lack of relevant quantitative information for the dermal route (e.g., wipe testing), dermal exposure was assessed using two approaches. First, dermal exposure was estimated assuming one third of the formaldehyde present within the sample matrix would be available for dermal contact and that dermal absorption was 100%. In the case of 100% dermal absorption, the indirect oral exposure route (i.e., exposure to formaldehyde on the hands via hand-to-mouth activity) was excluded. This first assessment was conservative, but the assumption that one third of the formaldehyde would be available for dermal contact was not based on quantitative data. Accordingly, as a second approach, it was assumed that 100% of the formaldehyde within the sample matrix was available for dermal contact, but a more realistic assumption for dermal absorption was assumed, and both dermal and indirect oral exposure were considered. Exposure via the inhalation route was also estimated.

Results are presented in Table 2. As indicated in Table 2, using the first dermal approach, the average daily intake of formaldehyde was estimated to be 22.8 µg/day. Using the second dermal approach, the average daily intake of formaldehyde was estimated to be 0.68 µg/day. The average daily intake via the inhalation route was estimated to be 0.03 µg/day. The average daily intake via indirect oral exposure was estimated to be 22.3 µg/day.

TABLE 2

| Assessment Approach | Inhalation (µg/day) | Dermal (µg/day) | Incidental Oral (µg/day) | Total Intake (µg/day) |
|---|---|---|---|---|
| Approach 1 | 0.03 | 22.8 | NA | 22.83 |
| Approach 2 | 0.03 | 0.68 | 22.3 | 23.01 |

Total daily intake, using the first approach and a highly conservative assumption that a sample user would be exposed simultaneously to the inhalation and dermal routes, was estimated to be 22.83 µg/day. Total daily intake, using the second approach and a highly conservative assumption that a sample user would be exposed simultaneously to all of the inhalation, dermal, and incidental oral routes, was estimated to be 23.01 µg/day. Regardless of the analysis approach taken, the total daily estimated exposure to formaldehyde was approximately one half the NSRL of 40 μg/day set by Prop 65.

Example 4—Compliance Testing of Comparative Example

The Comparative Example was evaluated for compliance with California Proposition 65 in regards to formaldehyde exposure. Exposure via inhalation, dermal contact, and indirect oral exposure were estimated similarly to Example 3. Results are presented in Table 3.

TABLE 3

| Inhalation (μg/day) | Dermal (μg/day) | Indirect Oral Exposure (μg/day) | Total Exposure (μg/day) |
|---|---|---|---|
| 102.9 | 60.0 | 10,482.0 | 10,644.9 |

The total daily estimated exposure to formaldehyde—10,644.9 μg/day—was about 266 times greater than the NSRL of 40 μg/day set by Prop 65. Accordingly, the Comparative Example would not be exempted from Prop 65 warning requirements.

Also, the total daily estimated exposure was about 463 times greater than that of Sample 1 in Example 3. Sample 1 provides a safer alternative to the Comparative Example in terms of significantly reduced exposure to formaldehyde for users.

As used herein, the term "about" may mean relative to the recited value, e.g., amount, temperature, time, percentage, etc., ±10%, ±9%, ±8%, ±7%, ±6%, ±5%, ±4%, ±3%, ±2%, or ±1%.

The above specification and examples and the accompanying drawings provide a complete description of the composition and use of exemplary embodiments of roof ridge vent materials having no or a low amount of formaldehyde. Although various embodiments have been described above with a certain degree of particularity, or with reference to one or more individual embodiments, those skilled in the art could make numerous alterations to the disclosed embodiments without departing from the spirit or scope of this disclosure. Other embodiments are therefore contemplated. All matter contained in the above description and the accompanying drawings is illustrative only of particular embodiments and not limiting. Changes in detail or structure may be made without departing from the basic elements described herein.

What is claimed is:

1. A composition comprising:
at least one polyester fiber, and
a binder mix comprising:
- at least one acrylic emulsion, wherein the at least one acrylic emulsion is a self-crosslinking binder;
- at least one fire retardant;
- at least one surfactant, wherein the at least one surfactant is a nonionic surfactant derived from neutrally charged long-chain fatty acids;
- at least one defoaming agent, wherein the at least one defoaming agent is present at about 0.024% to about 0.036% by weight of the binder mix, and wherein the defoaming agent is a water-based emulsion of wax and mineral oil; and
- water.

2. The composition of claim 1, wherein the polyester fiber is present at about 25% to about 65% by weight of the composition.

3. The composition of claim 1, wherein the at least one acrylic emulsion is present at about 70% to about 95% by weight of the binder mix, and wherein the at least one acrylic emulsion is free of alkyl phenol ethoxylates.

4. The composition of claim 1, wherein the at least one fire retardant is present at about 2.90% to about 4.40% by weight of the binder mix, and wherein the at least one fire retardant is a water-soluble liquid having a density of 1.190, a pH of 8.0, and a flash point greater than 212 degrees.

5. The composition of claim 1, wherein the at least one surfactant is present at about 0.016% to about 0.024% by weight of the binder mix, and wherein the at least one surfactant includes long-chain polyoxyethylene or polyoxypropylene groups.

6. The composition of claim 1, wherein the water is present at about 10% to about 16% by weight of the binder mix.

7. The composition of claim 1, further comprising at least one pigment.

8. The composition of claim 7, wherein the at least one pigment is present at about 0.30% to about 0.45% by weight of the binder mix.

9. The composition of claim 1, wherein the composition includes about 0 ppm to about 16 ppm formaldehyde.

10. The composition of claim 1, wherein the composition is free of a terpolymer of vinyl chloride, vinyl acetate, ethylene, a crosslinking agent, and a crosslinking resin.

11. A roofing strip comprising a roofing composition, the roofing composition comprising:
at least one polyester fiber, and
a binder mix comprising:
- at least one acrylic emulsion, wherein the at least one acrylic emulsion is a self-crosslinking binder;
- at least one fire retardant;
- at least one surfactant, wherein the at least one surfactant is a nonionic surfactant derived from neutrally charged long-chain fatty acids;
- at least one defoaming agent, wherein the at least one defoaming agent is present at about 0.024% to about 0.036% by weight of the binder mix, and wherein the defoaming agent is a water-based emulsion of wax and mineral oil; and
- water, wherein the composition is formed into a roofing strip.

12. The roofing strip of claim 11, wherein the roofing strip includes a first side having a flat and planar surface.

13. The roofing strip of claim 11, wherein the roofing strip includes a first side having a flat and planar surface, and a second side opposite the first side, the second side having a flat and planar surface.

14. The roofing strip of claim 11, wherein the roofing strip includes a first side having a flat and planar surface, and a second side opposite the first side, the second side configured to engage an uneven roof surface.

15. The roofing strip of claim 11, wherein the roofing strip includes a first side having a flat and planar surface, and a second side opposite the first side, the second side having a variable profile complimentary to an uneven roof surface.

16. The roofing strip of claim 11, wherein the roofing composition includes about 0 ppm to about 16 ppm formaldehyde.

17. A roofing strip comprising:

a base defining a plurality of recesses along a length of the strip, each recess separated from another recess by a section of the base and each recess extending across a full width of the strip; and an air permeable material received in the plurality of recesses defined in the base, the strip having a first side opposite a second side, wherein one of the first side or the second side has a planar surface and the other of the first side or the second side is configured to engage an uneven roof surface; and wherein the air permeable material comprises at least one polyester fiber and a binder mix, the binder mix comprising:

at least one acrylic emulsion, wherein the at least one acrylic emulsion is a self-crosslinking binder;

at least one fire retardant;

at least one surfactant, wherein the at least one surfactant is a nonionic surfactant derived from neutrally charged long-chain fatty acids;

at least one defoaming agent, wherein the at least one defoaming agent is present at about 0.024% to about 0.036% by weight of the binder mix, and wherein the defoaming agent is a water-based emulsion of wax and mineral oil; and water.

18. The roofing strip of claim 17, wherein the air permeable material is formed as a plurality of discontinuous sections, each section received in one of the plurality of recesses defined in the base.

19. The roofing strip of claim 17, wherein the air permeable material forms a continuous strip from one recess to another recess.

20. The roofing strip of claim 18, wherein the air permeable material traverses a surface of the section of the base separating each recess.

21. The roofing strip of claim 17, wherein the roofing composition includes about 0 ppm to about 16 ppm formaldehyde.

22. A method of installing a roofing strip, the method comprising:

applying a strip to a major roof panel, the strip including at least one material comprising:

at least one polyester fiber, and a binder mix comprising:

at least one acrylic emulsion, wherein the at least one acrylic emulsion is a self-crosslinking binder;

at least one fire retardant;

at least one surfactant, wherein the at least one surfactant is a nonionic surfactant derived from neutrally charged long-chain fatty acids;

at least one defoaming agent, wherein the at least one defoaming agent is present at about 0.024% to about 0.036% by weight of the binder mix, and wherein the defoaming agent is a water-based emulsion of wax and mineral oil; and water, and attaching a minor roof panel to the major roof panel such that the strip is positioned between the minor and major roof panels, wherein practicing the method results in an estimated total daily intake of up to about 25 μg/day formaldehyde.

23. The method of claim 22, wherein the estimated total daily intake of formaldehyde is less than performance of the same method except that the binder mix of the material includes a terpolymer of vinyl chloride, vinyl acetate, and ethylene instead of at least one acrylic emulsion.

* * * * *